United States Patent [19]

Fujie

[11] 4,396,256
[45] Aug. 2, 1983

[54] LARGE APERTURE RATIO, LONG FOCUS LENS

[75] Inventor: Daijiro Fujie, Mitaka, Japan

[73] Assignee: Nippon Kogaku K.K., Tokyo, Japan

[21] Appl. No.: 291,710

[22] Filed: Aug. 10, 1981

[30] Foreign Application Priority Data

Aug. 22, 1980 [JP] Japan ................................ 55-115374

[51] Int. Cl.³ .......................... G02B 9/00; G02B 9/60
[52] U.S. Cl. ..................................... 350/467; 350/450
[58] Field of Search ..................... 350/467, 449, 450

[56] References Cited

U.S. PATENT DOCUMENTS 2,012,822  8/1935  Lee ..................... 350/467 X
2,836,102  5/1958  Ito ......................... 350/467
2,985,071  5/1961  Becker ................... 350/467
3,357,776 12/1967  Becker ................... 350/467
3,948,584  3/1976  Basista et al. ........... 350/214

*Primary Examiner*—John K. Corbin
*Assistant Examiner*—Scott J. Sugarman
*Attorney, Agent, or Firm*—Shapiro and Shapiro

[57] ABSTRACT

A compact, large aperture ratio, long focus lens having a short total length includes, in succession from the object side, a first group comprising a positive meniscus lens having its convex surface facing the object side, a second group comprising a positive meniscus lens having its convex surface facing the object side, a third group comprising a negative meniscus lens consisting of a biconvex lens and a biconcave lens cemented thereto and having its convex surface facing the object side, a diaphragm, a fourth group comprising a meniscus lens consisting of a negative lens and a positive lens cemented thereto and having its convex surface facing the image side, and a fifth group comprising a positive lens.

7 Claims, 6 Drawing Figures

LARGE APERTURE RATIO, LONG FOCUS LENS

BACKGROUND OF THE INVENTION

1. Field of the Invention

This invention relates to improvements in a compact, large aperture ratio, long focus lens of a short total length having an angle of view of 28.5° and an aperture ratio of 1.4.

2. Description of the Prior Art

As a lens of such type, there is known the lens of U.S. Pat. No. 3,948,584 (Japanese Laid-open Patent Application No. 8527/1975) which uses a so-called modified Gauss type lens. This lens has a short back focal length and is compact for its long focal length, but in order to shorten the back focal length, the refractive power of the forward lens group disposed forwardly of the diaphragm has been made substantially stronger than the refractive power of the rearward lens group disposed rearwardly of the diaphragm and although this lens has a quite large aperture ratio, i.e., F-number 1.4, its imaging performance has been insufficient. That is, the allotment of aberrations to the positive lens group forming the forward group has been great and therefore, correction of annular spherical aberration has been insufficient, and the increased refractive power of the negative lens group forming the forward group has caused extreme over-correction of spherical aberration, particularly, spherical aberration for the short wavelength light in the vicinity of g-line ($\lambda = 436$ nm), and thus the performance under open conditions has not been sufficient.

SUMMARY OF THE INVENTION

It is an object of the present invention to overcome the above-noted disadvantages and to provide a compact, large aperture ratio, long focus lens of a short total length in which various aberrations, particularly, annular spherical aberration and chromatic aberration of spherical aberration, have been well corrected.

The invention will become fully apparent from the following detailed description thereof taken in conjunction with the accompanying drawings.

DESCRIPTION OF THE PREFERRED EMBODIMENT

Figure 1:
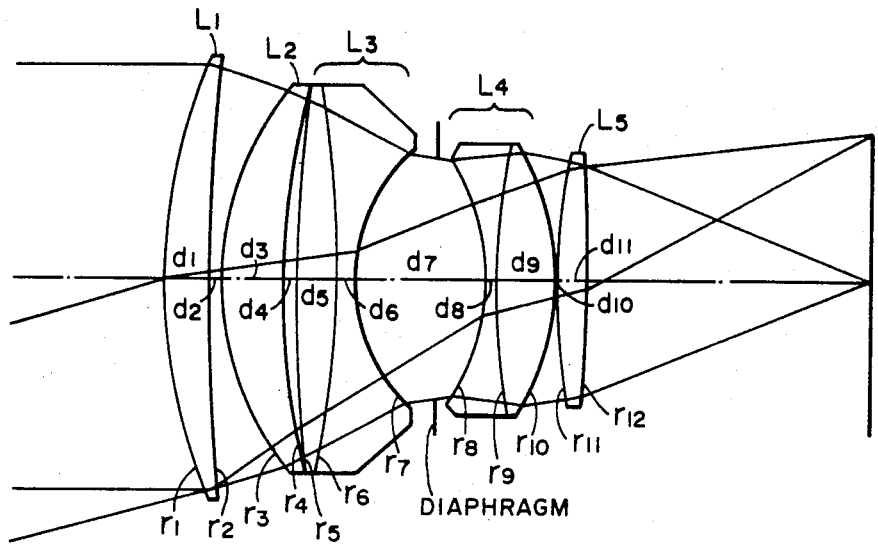
FIG. 1 is a cross-sectional view showing a lens construction according to a first, a second and a third embodiment of the present invention.
Figure 5:
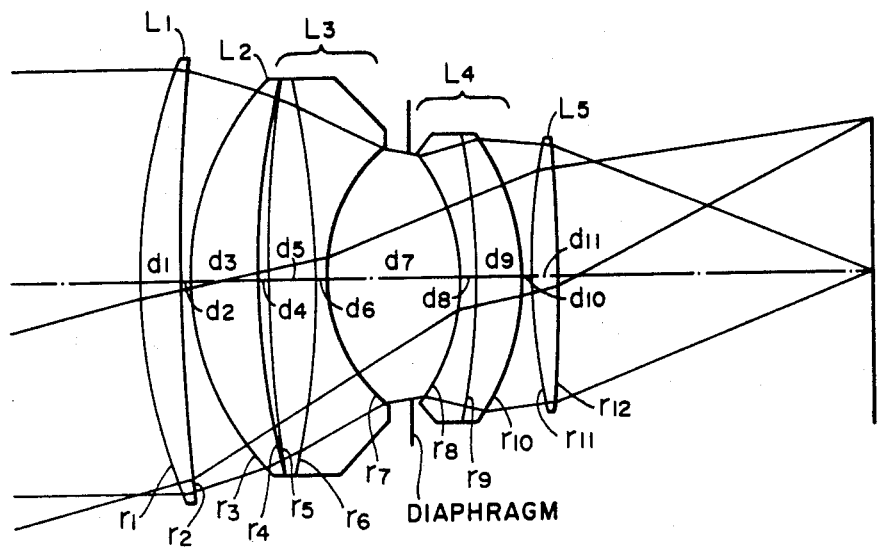
FIG. 5 is a cross-sectional view showing a lens construction according to a fourth embodiment of the present invention.

The present invention, as shown in FIG. 1 or 5, is a 5-group 7-component lens construction which comprises a first group $L_1$ comprising a positive meniscus lens having its convex surface facing the object side, a second group $L_2$ comprising a positive meniscus lens having its convex surface facing the object side, a third group $L_3$ comprising a biconvex lens and a biconcave lens cemented thereto and having its convex surface facing the object side, a fourth group $L_4$ comprising a negative lens and a positive lens cemented thereto and having its convex surface facing the image side, and a fifth group $L_5$ comprising a positive lens.

This lens construction satisfies the following conditions:

$$0.75\phi < \phi_1 < 0.85\phi \quad (1)$$

$$0.9\phi < \phi_2 < 1.1\phi \quad (2)$$

$$0 < -\phi_a < 0.3\phi \quad (3)$$

$$0 < (n_4 - n_3)/r_6 < 0.04\phi \quad (4)$$

$$\nu_4 > \nu_3 \quad (5)$$

$$(n_3 + n_4)/2 > 1.7 \quad (6)$$

where $r_6$ represents the radius of curvature of the cemented surface in the third group $L_3$, $n_3$ and $n_4$ represent the refractive indices of the biconvex lens and the biconcave lens, respectively, $\nu_3$ and $\nu_4$ represent the Abbe numbers of the biconvex lens and the biconcave lens, respectively, $\phi_1$ and $\phi_2$ represent the refractive powers of the positive meniscus lens of the first group $L_1$ and the positive meniscus lens of the second group $L_2$, respectively, $\phi_a$ represents the refractive power of the air lens formed between the second group $L_2$ and the third group $L_3$, and $\phi$ represents the refractive power of the entire system.

In accordance with the present invention, there is achieved a large aperture ratio, compact, long focus lens which has an F-number of the order of 1.4 and an angle of view of 28.5° and yet in which various aberrations, particularly, annular spherical aberration and chromatic aberration of spherical aberration are well corrected, and which has an excellent imaging performance.

Each of the above-mentioned conditions will hereinafter be explained.

In order to obtain a compact Gauss type lens having a short back focal length, it is necessary to make the refractive power of the lens groups disposed forwardly of the diaphragm substantially stronger than the refractive power of the lens group disposed rearwardly of the disphragm (hereinafter the rearward group). Accordingly, in order to obtain a large aperture ratio lens in which various aberrations have been well corrected while making the lens compact, appropriate distribution of refractive powers between the lens groups forming the forward group is important. Conditions (1)-(4) are the conditions for this purpose.

Condition (1) prescribes the refractive power of the first group $L_1$ through which the widest light beam passes. If the upper limit of this condition is exceeded, annular spherical aberration will be increased and a large aperture ratio cannot be achieved. On the other hand, if the lower limit of this condition is exceeded, it will be advantageous for the correction of aberrations but the converging action of the light beam will be insufficient and it will become difficult to reduce the back focal length to thereby make the entire lens system compact.

Also, in order to make the entire lens system compact, it is effective to intensify the refractive powers of the two positive lens groups $L_1$ and $L_2$ forming the forward group, but it is essential to minimize the creation of the high order aberrations by these lens groups through which a wide light beam passes. For that purpose, it will be advantageous to allot more refractive power to the second group $L_2$ immediately accompanied by an air lens having a diverging action. That is, $\phi_2 > \phi_1$ is desirable. Condition (2) specifically prescribes the range of the refractive power of the second group $L_2$ which should thus have a stronger refractive power. If the upper limit of this condition is exceeded, high order spherical aberration will occur excessively and cannot be negated even by the functions of other elements including the diverging action of the air lens prescribed by condition (3). If the lower limit of condition (2) is exceeded, the refractive power of the second group $L_2$ will become too small and it will become difficult to construct the entire lens system compactly while sufficiently correcting the various aberrations.

In order to alleviate high order negative spherical aberration and astigmatism which occur in the first group $L_1$ and the second group $L_2$ and to realize compactness and good aberration balance, the function of the air lens formed between the second group $L_2$ and the third group $L_3$ is important. Condition (3) prescribes the optimum value of the range of the refractive power of such air lens. That is, this air lens must be a divergent lens to negate negative aberrations and if the refractive power thereof is intensified, the refractive powers of the first group $L_1$ and the second group $L_2$ having positive refractive powers can be correspondingly intensified and this is advantageous for making the entire lens system compact. However, if the upper limit of condition (3) is exceeded, coma by the light rays of the off-axis light beam passing through the upper portion of the pupil will be increased.

As the positive refractive power of the forward group is increased to make the entire lens system compact, the refractive power of the third lens group $L_3$ having a negative refractive power must be intensified even if the diverging action of the air lens is effectively used on the basis of condition (3), and as a result, spherical aberration for the short wavelength light in the vicinity of g-line will become over-corrected, thus resulting in deteriorated performance under an open aperture condition.

Conditions (4)–(6) are for correcting the spherical aberration for the short wavelength light in the vicinity of g-line without aggravating the various abberrations for the standard wavelength (d-line, $\lambda = 587.6$ nm). That is, the third group $L_3$ is constituted by a biconvex lens and a biconcave lens and, under condition (4), high order negative spherical aberration is caused by the action the cemented surface $r_6$ having a positive refractive power. At this time, if the dispersion of the negative lens is greater than the dispersion of the positive lens as shown by condition (5), negative spherical aberration for g-line of short wavelength is increased more than for the standard wavelength (d-line), whereby the overcorrection of the spherical aberration for g-line is mitigated. By this, the coma for the light rays of a small angle of view, relatively strongly subjected to the influence of spherical aberration and passing through the lower portion of the pupil, is also improved. If the absolute value of the refractive power of the cemented surface $r_6$ becomes great in the positive sense beyond the upper limit of condition (4), negative curvature of image field and lower coma will become so great that it will be difficult to negate them by other elements. By increasing the negative spherical aberration for the short wavelength light under condition (5), the overcorrection of the spherical aberration for g-line can be mitigated. Greater differences in Abbe number between the lens groups result in a greater effect, but with the correction of the chromatic aberration in the entire system being taken into account, under condition (6), $0 < \nu_4 - \nu_3 < 3$ is desirable as the combination of existing glasses. Also, if the refractive indices $n_3$ and $n_4$ of the positive lens and negative lens in the third group $L_3$ depart from the range of condition (6), the curvature of the front surface $r_5$ of the third group $L_3$ will become smaller and this is not preferable in the correction of the spherical aberration for g-line. Or the curvature of the surface $r_7$ of the fourth group $L_4$ will become greater and spherical aberration, coma and off-axis sagittal flare will be increased. The upper limit of condition (6) is about 1.9.

In order to achieve compactness of the entire system while maintaining a rich quantity of marginal light, $$0.4 < \sum_{i=1}^{6} di / \sum_{i=1}^{11} di < 0.5 \text{ is desirable.}$$

The numerator represents the combined center thickness of the three lens groups forward of the diaphragm, and the denominator represents the combined center thickness of the entire lens system. If the value of this ratio exceeds its upper limit, sufficient convergence will be provided by the lens system forward of the rear surface $r_7$ of the third group $L_3$ and the back focal length will be shortened, and this is advantageous for making the entire system compact, but if the position of the entrance pupil comes into the rear of the first surface $r_1$ to cause an increased diameter of the forward lens or if the same filter size is used, the quantity of marginal light will be reduced and this is not preferable. If the lower limit is exceeded, it will become difficult to achieve compactness.

Figure 2:
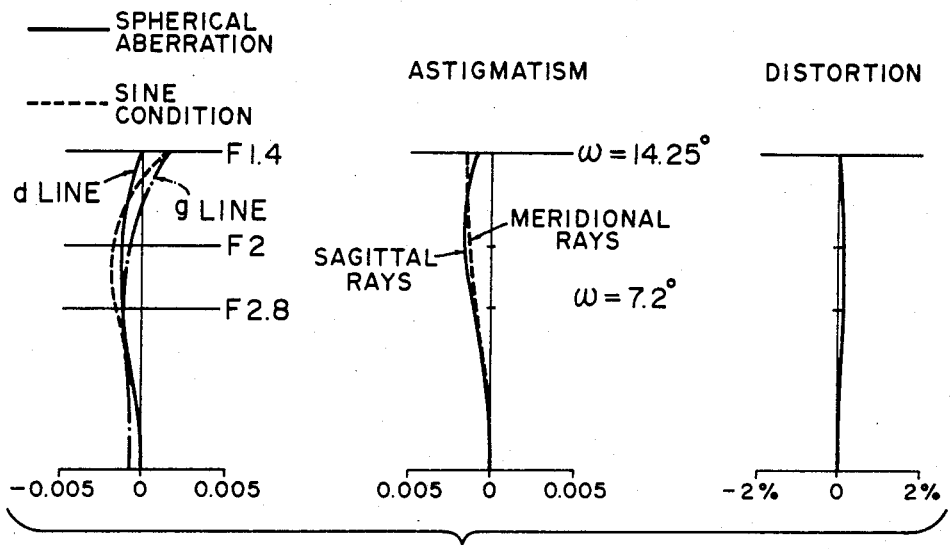
FIGS. 2, 3 and 4 illustrate the spherical aberration, sine condition, astigmatism and distortion in the first to third embodiments when $f = 1$ mm.
Figure 3:
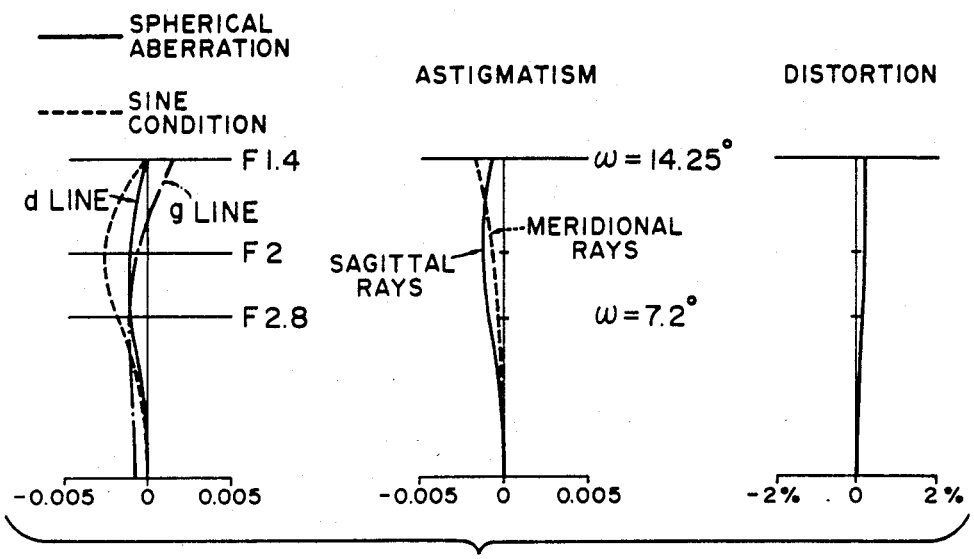
Figure 4:
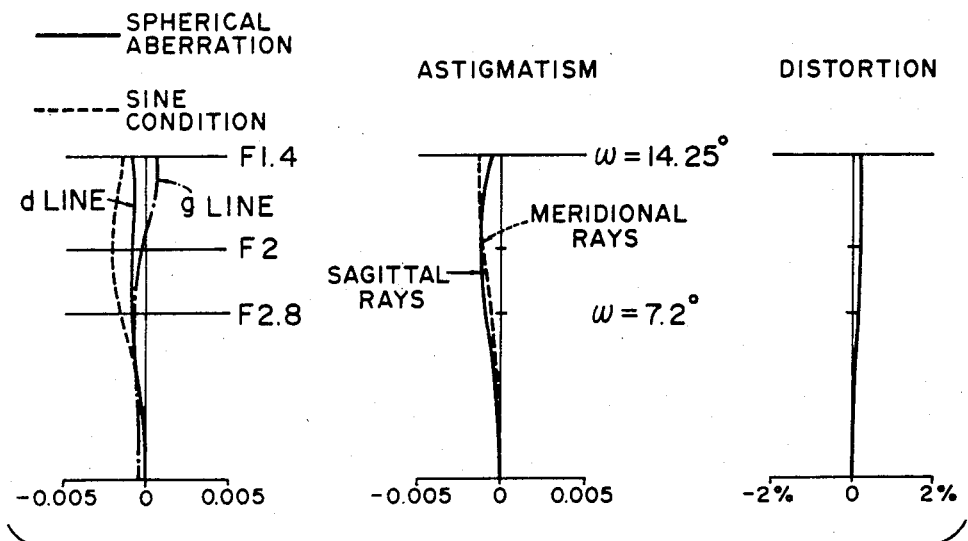
Figure 6:
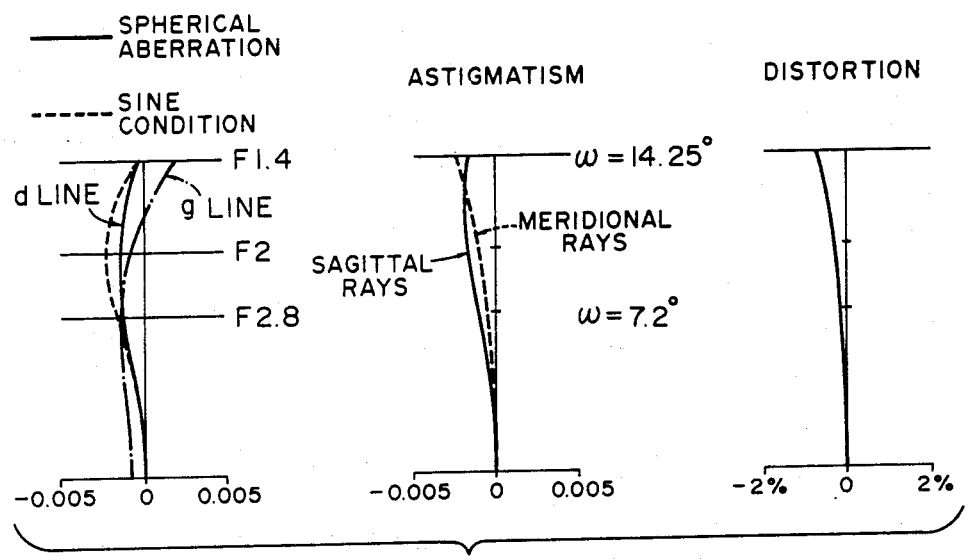
FIG. 6 illustrates the spherical aberration, sine condition, astigmatism and distortion in the fourth embodiment when $f = 1$ mm.

The lens cross-sectional shapes of a first, a second and a third embodiment of the present invention are substantially similar to one another, as shown in FIG. 1, and the various aberrations therein for an object at infinity are illustrated in FIGS. 2, 3 and 4 respectively. The lens cross-sectional shape of a fourth embodiment is shown in FIG. 5 and the various aberrations therein for an object at infinity are illustrated in FIG. 6. Also, in FIGS. 1 and 5, marginal rays from the object point at infinity on the axis and marginal rays of a maximum angle of view are shown respectively.

The numerical data of these embodiments will be shown below. In the tables below, $r_1, r_2, \ldots$, represent the radii of curvature of the successive lens surfaces from the object side, $d_1, d_2, \ldots$, represent the center thicknesses and air spaces of the respective lenses, and $n_1, n_2, \ldots$, and $\nu_1, \nu_2, \ldots$, represent the refractive indices and the Abbe numbers, respectively, of the respective lenses.

Embodiment 1

| $f = 1.0$ F 1:1.4 Angle of view 28.5° Back focal length 0.5015 | | | |
|---|---|---|---|
| $r_1 = 0.7816$ | $d_1 = 0.0882$ | $n_1 = 1.77279$ $\nu_1 = 49.4$ | $L_1$ |
| $r_2 = 4.0776$ | $d_2 = 0.0176$ | | |
| $r_3 = 0.4368$ | $d_3 = 0.1141$ | $n_2 = 1.69680$ $\nu_2 = 55.6$ | $L_2$ |
| $r_4 = 1.1353$ | $d_4 = 0.0176$ | | |
| $r_5 = 1.9680$ | $d_5 = 0.0765$ | $n_3 = 1.78470$ $\nu_3 = 26.1$ | $L_3$ |
| $r_6 = -1.4118$ | $d_6 = 0.0329$ | $n_4 = 1.75520$ $\nu_4 = 27.5$ | |

-continued

| f = 1.0 F 1:1.4 Angle of view 28.5° Back focal length 0.5015 | | | | |
|---|---|---|---|---|
| $r_7 = 0.2781$ | $d_7 = 0.2294$ | | | |
| $r_8 = -0.3695$ | $d_8 = 0.0176$ | $n_5 = 1.58144$ | $v_5 = 40.8$ | ⎫ L₄ |
| $r_9 = 0.9389$ | $d_9 = 0.1024$ | $n_6 = 1.74443$ | $v_6 = 49.4$ | ⎭ |
| $r_{10} = -0.4683$ | $d_{10} = 0.0047$ | | | |
| $r_{11} = 1.2471$ | $d_{11} = 0.0565$ | $n_7 = 1.74443$ | $v_7 = 49.4$ | L₅ |
| $r_{12} = -3.7930$ | | | | |

Embodiment 2

| f = 1.0 F 1:1.4 Angle of view 28.5° Back focal length 0.4897 | | | | |
|---|---|---|---|---|
| $r_1 = 0.8002$ | $d_1 = 0.0941$ | $n_1 = 1.67025$ | $v_1 = 57.5$ | L₁ |
| $r_2 = 12.6777$ | $d_2 = 0.0176$ | | | |
| $r_3 = 0.4128$ | $d_3 = 0.1112$ | $n_2 = 1.67025$ | $v_2 = 57.5$ | L₂ |
| $r_4 = 1.0654$ | $d_4 = 0.0212$ | | | |
| $r_5 = 2.1164$ | $d_5 = 0.0841$ | $n_3 = 1.75520$ | $v_3 = 27.5$ | ⎫ L₃ |
| $r_6 = -1.1765$ | $d_6 = 0.0247$ | $n_4 = 1.71736$ | $v_4 = 29.5$ | ⎭ |
| $r_7 = 0.2721$ | $d_7 = 0.2294$ | | | |
| $r_8 = -0.3709$ | $d_8 = 0.0176$ | $n_5 = 1.58144$ | $v_5 = 40.8$ | ⎫ L₄ |
| $r_9 = 0.9389$ | $d_9 = 0.1024$ | $n_6 = 1.74443$ | $v_6 = 49.4$ | ⎭ |
| $r_{10} = -0.4672$ | $d_{10} = 0.0059$ | | | |
| $r_{11} = 1.2471$ | $d_{11} = 0.0565$ | $n_7 = 1.77179$ | $v_7 = 49.4$ | L₅ |
| $r_{12} = -5.4290$ | | | | |

Embodiment 3

| f = 1.0 F 1:1.4 Angle of view 28.5° Back focal length 0.4905 | | | | |
|---|---|---|---|---|
| $r_1 = 0.7885$ | $d_1 = 0.0882$ | $n_1 = 1.74810$ | $v_1 = 52.3$ | L₁ |
| $r_2 = 5.1565$ | $d_2 = 0.0176$ | | | |
| $r_3 = 0.4288$ | $d_3 = 0.1141$ | $n_2 = 1.69680$ | $v_2 = 55.6$ | L₂ |
| $r_4 = 1.0812$ | $d_4 = 0.0200$ | | | |
| $r_5 = 2.0164$ | $d_5 = 0.0741$ | $n_3 = 1.80518$ | $v_3 = 25.5$ | ⎫ L₃ |
| $r_6 = -1.2941$ | $d_6 = 0.0329$ | $n_4 = 1.75520$ | $v_4 = 27.5$ | ⎭ |
| $r_7 = 0.2788$ | $d_7 = 0.2294$ | | | |
| $r_8 = -0.3669$ | $d_8 = 0.0176$ | $n_5 = 1.58144$ | $v_5 = 40.8$ | ⎫ L₄ |
| $r_9 = 1.0000$ | $d_9 = 0.1024$ | $n_6 = 1.74443$ | $v_6 = 49.4$ | ⎭ |
| $r_{10} = -0.4736$ | $d_{10} = 0.0047$ | | | |
| $r_{11} = 1.2471$ | $d_{11} = 0.0565$ | $n_7 = 1.74443$ | $v_7 = 49.4$ | L₅ |
| $r_{12} = -3.5846$ | | | | |

Embodiment 4

| f = 1.0 F 1:1.4 Angle of view 28.5° Back focal length 0.5556 | | | | |
|---|---|---|---|---|
| $r_1 = 0.8010$ | $d_1 = 0.0824$ | $n_1 = 1.77279$ | $v_1 = 49.4$ | L₁ |
| $r_2 = 3.5094$ | $d_2 = 0.0165$ | | | |
| $r_3 = 0.4518$ | $d_3 = 0.1141$ | $n_2 = 1.69350$ | $v_2 = 53.6$ | L₂ |
| $r_4 = 1.1068$ | $d_4 = 0.0165$ | | | |
| $r_5 = 1.7502$ | $d_5 = 0.0894$ | $n_3 = 1.78470$ | $v_3 = 26.1$ | ⎫ L₃ |
| $r_6 = -1.2356$ | $d_6 = 0.0212$ | $n_4 = 1.75520$ | $v_4 = 27.5$ | ⎭ |
| $r_7 = 0.3007$ | $d_7 = 0.2294$ | | | |
| $r_8 = -0.3341$ | $d_8 = 0.0353$ | $n_5 = 1.72825$ | $v_5 = 28.3$ | ⎫ L₄ |
| $r_9 = -0.7647$ | $d_9 = 0.0800$ | $n_6 = 1.78797$ | $v_6 = 47.5$ | ⎭ |
| $r_{10} = -0.3953$ | $d_{10} = 0.0059$ | | | |
| $r_{11} = 0.9647$ | $d_{11} = 0.0471$ | $n_7 = 1.78797$ | $v_7 = 47.5$ | L₅ |
| $r_{12} = -3.8048$ | | | | |

As described above, according to the present invention, there is provided a long focus lens which has a large aperture ratio, which is compact, and yet in which various aberrations including spherical aberration for g-line have been well corrected as shown in the aberration graphs. Further, in the present invention, the deterioration of the characteristics of aberrations such as astigmatism, coma, etc. for an object at a short distance can be well corrected by axially moving the entire system and at the same time, moving the first group $L_1$ to the forth group $L_4$ as a unit in response to the axial movement of the entire system so as to enlarge the spacing $d_{10}$ between the fourth group and the fifth group $L_5$.

What I claim is:

1. A compact, large aperture ratio, long focus lens having a short total length and in which various aberrations, particularly, annular spherical aberration and chromatic aberration of spherical aberration, are well corrected, including, in succession from the object side:

a first group comprising a positive meniscus lens having its convex surface facing the object side;

a second group comprising a positive meniscus lens having its convex surface facing the object side;

a third group comprising a negative meniscus lens consisting of a biconvex lens and a biconcave lens cemented thereto and having its convex surface facing the object side, the dispersion of said biconvex lens being greater than that of said biconcave lens;

a diaphragm;

a fourth group comprising a meniscus lens consisting of a negative lens and a positive lens cemented thereto and having its convex surface facing the image side; and a fifth group comprising a positive lens;

said second group and said third group forming therebetween an air lens having a divergent refractive power.

2. A lens according to claim 1, which satisfies the following conditions:

$$0.75\phi < \phi_1 < 0.85\phi \qquad (1)$$

$$0.9\phi < \phi_2 < 1.1\phi \qquad (2)$$

$$0 < -\phi_a < 0.3\phi \qquad (3)$$

$$0 < (n_4 - n_3)r_6 < 0.04\phi \qquad (4)$$

$$v_4 > v_3 \qquad (5)$$

$$(n_3 + n_4)/2 > 1.7 \qquad (6)$$

where $r_6$ represents the radius of curvature of the cemented surface in said third group, $n_3$ and $n_4$ represent the refractive indices of said biconvex lens and said biconcave lens, respectively, in said third group, $v_3$ and $v_4$ represent the Abbe numbers of said biconvex lens and said biconcave lens, respectively, $\phi_1$ and $\phi_2$ represent the refractive powers of said positive meniscus lens of said first group and said positive meniscus lens of said second group, respectively, $\phi_a$ represents the refractive power of the air lens formed between said second group and said third group, and $\phi$ represents the refractive power of the entire system.

3. A lens according to claim 2, which further satisfies the following conditions:

$$0 < v_4 - v_3 < 3 \text{ and}$$

-continued $$0.4 < \frac{\sum_{i=1}^{6} d_i}{\sum_{i=1}^{11} d_i} < 0.5$$

where the numerator of the last condition represents the combined center thickness of the three lens groups forward of the diaphragm, and the denominator represents the combined center thickness of the entire lens system.

4. A lens according to claim 3, wherein numerical data are as follows:

| f = 1.0 F 1:1.4 Angle of view 28.5° Back focal length 0.5015 | | | | |
|---|---|---|---|---|
| $r_1 = 0.7816$ | $d_1 = 0.0882$ | $n_1 = 1.77279$ | $\nu_1 = 49.4$ | $L_1$ |
| $r_2 = 4.0776$ | $d_2 = 0.0176$ | | | |
| $r_3 = 0.4368$ | $d_3 = 0.1141$ | $n_2 = 1.69680$ | $\nu_2 = 55.6$ | $L_2$ |
| $r_4 = 1.1353$ | $d_4 = 0.0176$ | | | |
| $r_5 = 1.9680$ | $d_5 = 0.0765$ | $n_3 = 1.78470$ | $\nu_3 = 26.1$ | $L_3$ |
| $r_6 = -1.4118$ | $d_6 = 0.0329$ | $n_4 = 1.75520$ | $\nu_4 = 27.5$ | |
| $r_7 = 0.2781$ | $d_7 = 0.2294$ | | | |
| $r_8 = -0.3695$ | $d_8 = 0.0176$ | $n_5 = 1.58144$ | $\nu_5 = 40.8$ | $L_4$ |
| $r_9 = 0.9389$ | $d_9 = 0.1024$ | $n_6 = 1.74443$ | $\nu_6 = 49.4$ | |
| $r_{10} = -0.4683$ | $d_{10} = 0.0047$ | | | |
| $r_{11} = 1.2471$ | $d_{11} = 0.0565$ | $n_7 = 1.74443$ | $\nu_7 = 49.4$ | $L_5$ |
| $r_{12} = -3.7930$ | | | | | where $r_1, r_2 \ldots$, represent the radii of curvature of the successive lens surfaces from the object side, $d_1, d_2, \ldots$, represent the center thicknesses and air spaces of the respective lenses, and $n_1, n_2, \ldots$, and $\nu_1, \nu_2, \ldots$, represent the refractive indices and the Abbe numbers, respectively, of the respective lenses.

5. A lens according to claim 3, wherein numerical data are as follows:

| f = 1.0 F 1:1.4 Angle of view 28.5° Back focal length 0.4897 | | | | |
|---|---|---|---|---|
| $r_1 = 0.8002$ | $d_1 = 0.0941$ | $n_1 = 1.67025$ | $\nu_1 = 57.5$ | $L_1$ |
| $r_2 = 12.6777$ | $d_2 = 0.0176$ | | | |
| $r_3 = 0.4128$ | $d_3 = 0.1112$ | $n_2 = 1.67025$ | $\nu_2 = 57.5$ | $L_2$ |
| $r_4 = 1.0654$ | $d_4 = 0.0212$ | | | |
| $r_5 = 2.1164$ | $d_5 = 0.0841$ | $n_3 = 1.75520$ | $\nu_3 = 27.5$ | $L_3$ |
| $r_6 = -1.1765$ | $d_6 = 0.0247$ | $n_4 = 1.71736$ | $\nu_4 = 29.5$ | |
| $r_7 = 0.2721$ | $d_7 = 0.2294$ | | | |
| $r_8 = -0.3709$ | $d_8 = 0.0176$ | $n_5 = 1.58144$ | $\nu_5 = 40.8$ | $L_4$ |
| $r_9 = 0.9389$ | $d_9 = 0.1024$ | $n_6 = 1.74443$ | $\nu_6 = 49.4$ | |
| $r_{10} = -0.4672$ | $d_{10} = 0.0059$ | | | |
| $r_{11} = 1.2471$ | $d_{11} = 0.0565$ | $n_7 = 1.77179$ | $\nu_7 = 49.4$ | $L_5$ |
| $r_{12} = -5.4290$ | | | | | where $r_1, r_2, \ldots$, represent the radii of curvature of the successive lens surfaces from the object side, $d_1, d_2, \ldots$, represent the center thicknesses and air spaces of the respective lenses, and $n_1, n_2, \ldots$, and $\nu_1, \mu_2, \ldots$, represent the refractive indices and the Abbe numbers, respectively, of the respective lenses.

6. A lens according to claim 3, wherein numerical data are as follows:

| f = 1.0 F 1:1.4 Angle of view 28.5° Back focal length 0.4905 | | | | |
|---|---|---|---|---|
| $r_1 = 0.7885$ | $d_1 = 0.0882$ | $n_1 = 1.74810$ | $\nu_1 = 52.3$ | $L_1$ |
| $r_2 = 5.1565$ | $d_2 = 0.0176$ | | | |
| $r_3 = 0.4288$ | $d_3 = 0.1141$ | $n_2 = 1.69680$ | $\nu_2 = 55.6$ | $L_2$ |
| $r_4 = 1.0812$ | $d_4 = 0.0200$ | | | |
| $r_5 = 2.0164$ | $d_5 = 0.0741$ | $n_3 = 1.80518$ | $\nu_3 = 25.5$ | $L_3$ |
| $r_6 = -1.2941$ | $d_6 = 0.0329$ | $n_4 = 1.75520$ | $\nu_4 = 27.5$ | |
| $r_7 = 0.2788$ | $d_7 = 0.2294$ | | | |
| $r_8 = -0.3669$ | $d_8 = 0.0176$ | $n_5 = 1.58144$ | $\nu_5 = 40.8$ | $L_4$ |
| $r_9 = 1.0000$ | $d_9 = 0.1024$ | $n_6 = 1.74443$ | $\nu_6 = 49.4$ | |
| $r_{10} = -0.4736$ | $d_{10} = 0.0047$ | | | |
| $r_{11} = 1.2471$ | $d_{11} = 0.0565$ | $n_7 = 1.74443$ | $\nu_7 = 49.4$ | $L_5$ |
| $r_{12} = -3.5846$ | | | | | where $r_1, r_2, \ldots$, represent the radii of curvature of the successive lens surfaces from the object side, $d_1, d_2, \ldots$, represent the center thicknesses and air spaces of the respective lenses, and $n_1, n_2, \ldots$, and $\nu_1, \nu_2, \ldots$, represent the refractive indices and the Abbe numbers, respectively, of the respective lenses.

7. A lens according to claim 3, wherein numerical data are as follows:

| f = 1.0 F 1:1.4 Angle of view 28.5° Back focal length 0.5556 | | | | |
|---|---|---|---|---|
| $r_1 = 0.8010$ | $d_1 = 0.0824$ | $n_1 = 1.77279$ | $\nu_1 = 49.4$ | $L_1$ |
| $r_2 = 3.5094$ | $d_2 = 0.0165$ | | | |
| $r_3 = 0.4518$ | $d_3 = 0.1141$ | $n_2 = 1.69350$ | $\nu_2 = 53.6$ | $L_2$ |
| $r_4 = 1.1068$ | $d_4 = 0.0165$ | | | |
| $r_5 = 1.7502$ | $d_5 = 0.0894$ | $n_3 = 1.78470$ | $\nu_3 = 26.1$ | $L_3$ |
| $r_6 = -1.2356$ | $d_6 = 0.0212$ | $n_4 = 1.75520$ | $\nu_4 = 27.5$ | |
| $r_7 = 0.3007$ | $d_7 = 0.2294$ | | | |
| $r_8 = -0.3341$ | $d_8 = 0.0353$ | $n_5 = 1.72825$ | $\nu_5 = 28.3$ | $L_4$ |
| $r_9 = -0.7647$ | $d_9 = 0.0800$ | $n_6 = 1.78797$ | $\nu_6 = 47.5$ | |
| $r_{10} = -0.3953$ | $d_{10} = 0.0059$ | | | |
| $r_{11} = 0.9647$ | $d_{11} = 0.0471$ | $n_7 = 1.78797$ | $\nu_7 = 47.5$ | $L_5$ |
| $r_{12} = -3.8048$ | | | | | where $r_1, r_2, \ldots$, represent the radii of curvature of the successive lens surfaces from the object side, $d_1, d_2, \ldots$, represent the center thicknesses and air spaces of the respective lenses, and $n_1, n_2, \ldots$, and $\nu_1, \nu_2, \ldots$, represent the refractive indices and the Abbe numbers, respectively, of the respective lenses.

* * * * *